United States Patent [19]

Taplin

[11] 4,092,998

[45] June 6, 1978

[54] AUTOMATIC PRESSURE REGULATOR

[76] Inventor: John F. Taplin, 15 Sewall St., West Newton, Mass. 02165

[21] Appl. No.: 815,042

[22] Filed: Jul. 12, 1977

Related U.S. Application Data

[63] Continuation-in-part of Ser. No. 692,811, Jun. 4, 1976, abandoned.

[51] Int. Cl.² ........................................... G05D 16/06
[52] U.S. Cl. ................................... 137/471; 137/501; 137/508; 251/DIG. 2
[58] Field of Search .................... 137/494, 503, 505.13, 137/505.18, 508, 510, DIG. 8, 471, 501, 469; 251/61.1, DIG. 2

[56] References Cited

U.S. PATENT DOCUMENTS

| | | | |
|---|---|---|---|
| 2,720,378 | 10/1955 | Otto | 251/61.1 |
| 3,070,108 | 12/1962 | Fischer | 251/DIG. 2 |
| 3,766,933 | 10/1973 | Nicholson | 251/DIG. 2 |
| 3,948,285 | 4/1976 | Flynn | 137/494 |

*Primary Examiner*—Robert G. Nilson
*Attorney, Agent, or Firm*—Erwin Salzer

[57] ABSTRACT

An automatic pressure regulator of the rolling diaphragm type requiring but one single rolling diaphragm. The diaphragm is of the deep convolution type. The rolling wall of the diaphragm controls the effective cross-sectional area of an orifice means which, in turn, effects the regulation of pressure. The force created by the high pressure acts against a spring tending to move the rolling wall of the rolling diaphragm to the orifice closing position thereof. The effective area of the rolling wall of the rolling diaphragm is variable to compensate for variations of the force of the spring resulting from changes of its length.

14 Claims, 7 Drawing Figures

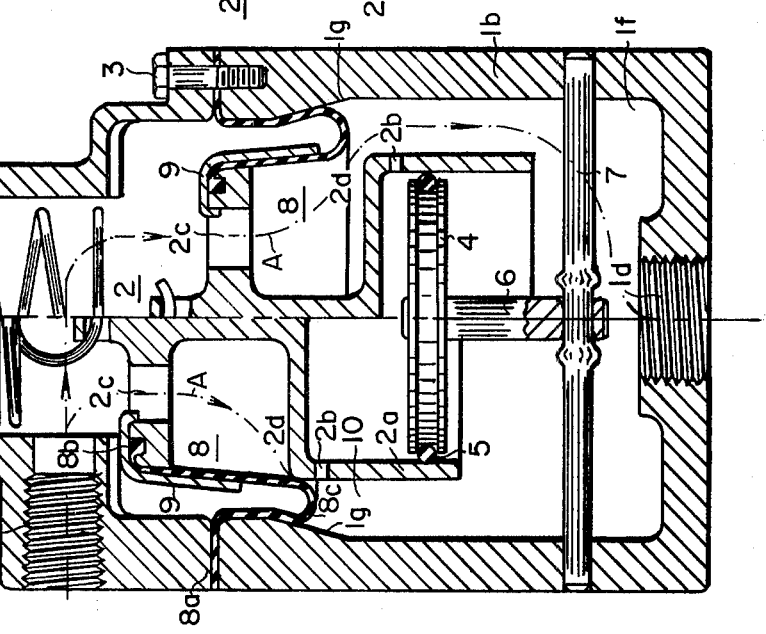
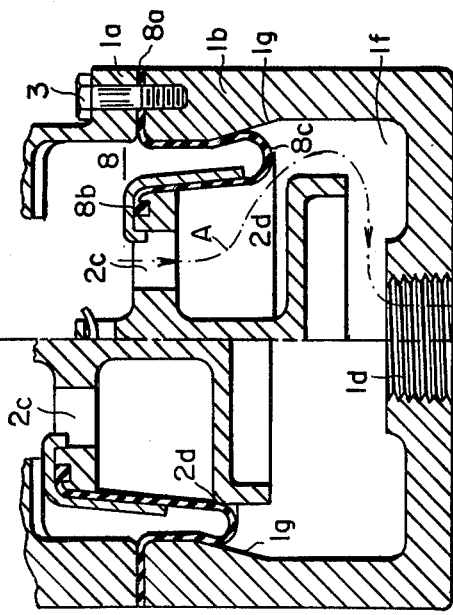
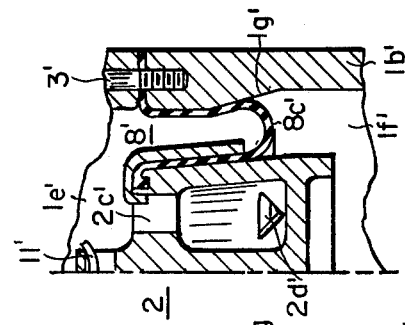
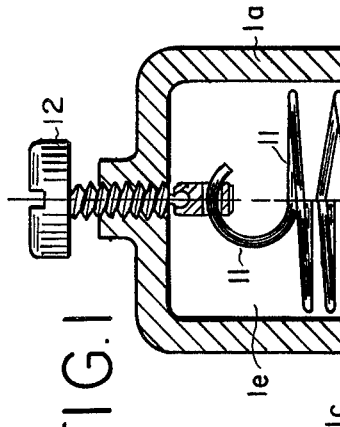

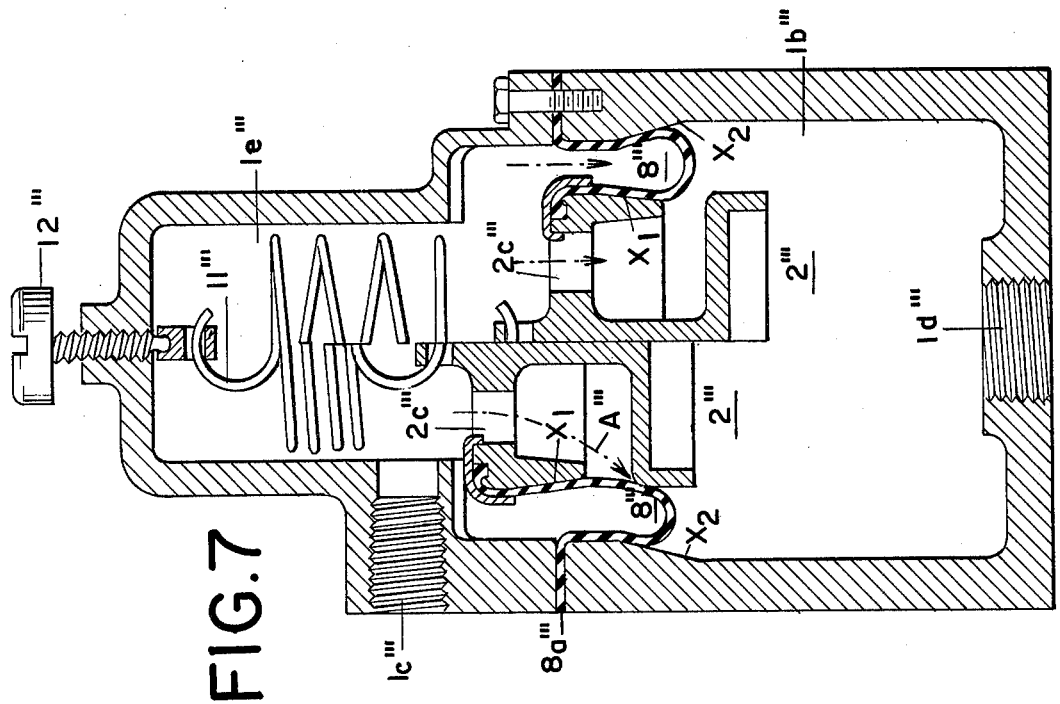
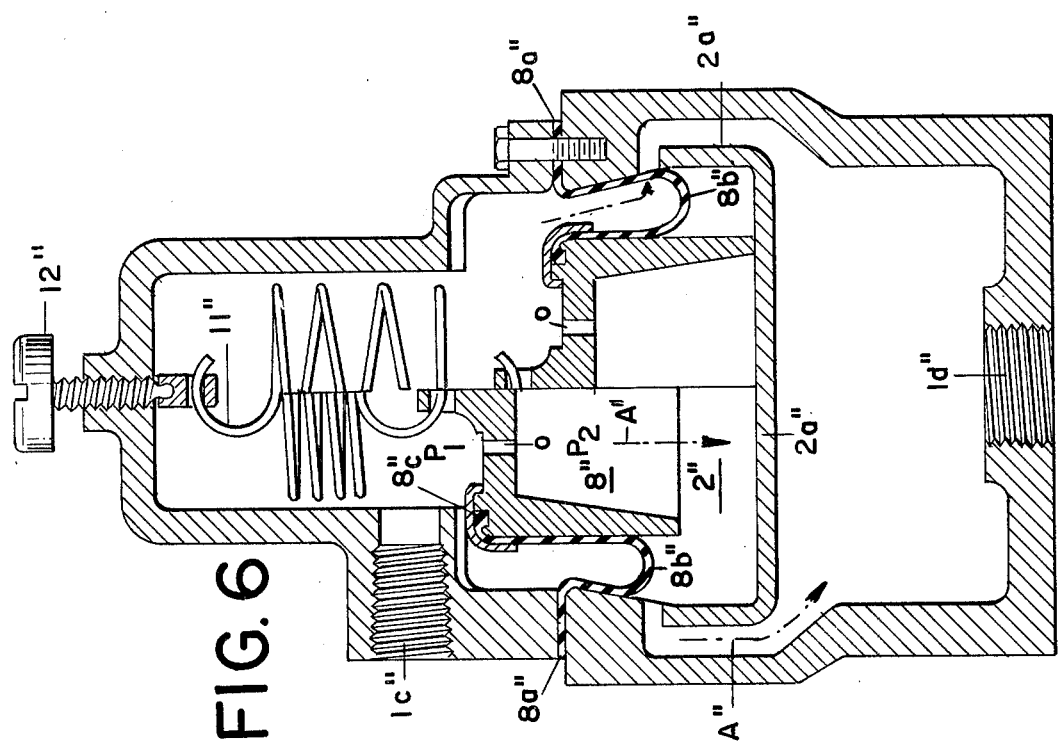

AUTOMATIC PRESSURE REGULATOR

This is a continuation-in-part of my copending patent application Ser. No. 692,811, filed June 4, 1976, now abandoned.

BACKGROUND OF THE INVENTION

There are many prior art automatic pressure regulators based upon various pressure sensing and pressure regulating means. These means include also rolling diaphragms.

All prior art pressure regulators are relatively complex which includes also pressure regulators predicated on the use of rolling diaphragms.

It is, therefore, the primary object of this invention to provide pressure regulators which are less complex than prior art pressure regulators, and may be manufactured at smaller cost than prior art pressure regulators.

Another object of the invention is to provide pressure regulators complying with the above requirements, predicated on the use of deep convolution rolling diaphragms, and requiring but one single such diaphragm.

Still another object of the invention is to provide rolling diaphragm pressure regulators of utmost simple design, wherein the gradient of the regulating spring is more or less compensated by changes of the effective area of the rolling wall of the rolling diaphragm.

SUMMARY OF THE INVENTION

Pressure regulators embodying this invention include a housing defining two passageways of which one may be referred-to as inlet and the other as outlet. The pressure at the inlet exceeds that of the outlet, and it is the pressure at the inlet that is regulated. A piston body is arranged inside the housing and defines an additional passageway which may also be referred-to as piston passageway. The radially outer portion of a deep convolution rolling diaphragm is affixed to said housing, its radially inner position is affixed to said piston body and its convoluted rolling wall is interposed between said housing and said piston body, i.e. positioned in the annular gap formed between these two parts. One side of the rolling diaphragm is acted upon by the inlet pressure, its opposite side is acted upon by the lower outlet pressure which may also be a vacuum or negative pressure, and the rolling wall is arranged to control the effective cross-sectional area of the aforementioned additional passageway or piston passageway. As a result, the rolling wall of the rolling diaphragm controls the flow of fluid or gas from the inlet to the outlet. The piston body is acted upon by spring means interposed between said housing and said piston body tending to cause said rolling wall of the rolling diaphragm to reduce the effective crosssectional area of said additional or piston passageway, or to close that passageway altogether. The annular space between the housing and the piston body has boundary walls of such configuration that the effective area of the rolling wall of the rolling diaphragm increases as said piston body moves against the action of said biasing spring means.

BRIEF DESCRIPTION OF THE DRAWINGS

FIG. 1 is substantially a longitudinal section of a regulator embodying the present invention, the left part of FIG. 1 showing the constituent elements of the regulator in the fully closed limit position and the right part of FIG. 1 showing the constituent elements of the regulator in the fully open limit position thereof;

FIG. 2 shows a modified detail of the structure of FIG. 1 in longitudinal section;

FIG. 3 shows a portion of a simplified version of the structure of FIG. 1 in the same way as FIG. 1;

FIG. 4 shows the effective area of a rolling diaphragm device without spring gradient compensation plotted against percent of stroke;

FIG. 5 shows the effective area of a rolling diaphragm device with spring gradient compensation plotted against percent of stroke;

FIG. 6 is a flow regulator or flow controller embodying the invention; and

FIG. 7 is a safety relief valve or blow-off valve embodying the invention.

DESCRIPTION OF PREFERRED EMBODIMENTS

Referring now to FIG. 1 of the drawing, reference characters $1a$ and $1b$ have been applied to indicate the upper part and the lower part of a regulator housing. The upper part $1a$ defines an inlet passageway $1c$ and the lower part $1b$ defines an outlet passageway $1d$. The inlet area $1e$ is situated adjacent inlet passageway $1c$ and the outlet area $1f$ is situated adjacent outlet passageway $1d$. Reference numeral 2 has been applied to generally indicate a piston arranged and movable inside the housing $1a,1b$ whose parts are tied together by screws 3 of which but one has been shown in FIGS. 1 and 3. Piston body 2 defines an additional passageway or piston passageway allowing the flow of fluid from inlet $1c$ and inlet area $1e$ through piston body 2 to outlet area $1f$ and outlet passageway $1d$. This additional or piston passageway and the flow of fluid through it have been indicated diagrammatically by the dash-and-dot line A. Piston body 2 includes a cylindrical skirt $2a$ forming a cylinder in which a piston 4 is arranged. Piston 4 is provided with an O-ring 5 and a piston rod 6. The latter is supported in the lower part $1b$ of housing $1a$, $1b$ by transverse pin 7. Skirt $2a$ is provided with a lateral perforation $2b$.

Reference character 8 has been applied to generally indicate a deep convolution rolling diaphragm. The radially outer portion $8a$ of diaphragm 8 is affixed to housing $1a$, $1b$ and the radially inner portion $8b$ of diaphragm 8 is affixed by means of clamp 9 to the upper end surface of piston body 2. There is a clearance or substantially toroidal space 10 left between piston body 2 and the inner surafce of housing $1a$, $1b$. The rolling wall $8c$ of diaphragm 8 is arranged in that space 10. The upper side of rolling wall $8c$ is acted upon by the pressure prevailing in inlet area $1e$ and the lower side of rolling wall $8c$ is acted upon by the lower pressure prevailing in the outlet area $1f$. It will be apparent from FIG. 1 that the rolling wall $8c$ is arranged to control the effective cross-sectional area of the additional fluid passageway indicated by the dash-and-dot line A.

The effective area of rolling wall $8c$ is equal to the annular area defined by its convolution. Since the lower portion $1b$ of housing $1a$, $1b$ has a slanting inner wall section $1g$, the effective area of the rolling wall $8c$ increases as the stroke of the piston body 2 in downward direction increases. This compensates at least in part for the increase of the action of spring 11 upon piston body 2 as the stroke of the latter in downward direction increases.

Assuming that the force of spring 11 upon piston body 2 increases $\Delta p$ lbs when the stroke of piston body 2 increases $\Delta s$ inches, and assuming further that the effective area of rolling wall 8c increases when the stroke of piston body 2 increases Δ s to such an extent that the force acting upon the rolling wall 8c increases Δ p lbs, this would mean that the increase of spring tension is fully compensated by the increase in the effective area of the rolling wall 8c. Under such conditions the force of spring 11 upon piston body 2 would be constant for all positions of piston body 2 or, in other words, the bias of piston body 2 would be an invariant. It is not necessary to go to such an extreme. It is, however, desirable to compensate in part the increase of the force exerted by spring 11 as the stroke of piston body 2 in downward direction increases which is effected by an appropriate increase of the effective area of the rolling wall 8c. As mentioned above, such an increase can be brought about by the slanting wall portion 1g. As an alternative, the same compensatory effect may be achieved by providing the piston body 2 with a slanting lateral wall.

FIG. 4 shows that the effective area in square inches of a rolling wall of a rolling diaphragm is independent from the length of the stroke of the piston body or a constant in case that the housing and the piston body define therebetween a toroidal space of constant inner and outer diameter.

FIG. 5 shows that the effective area in square inches of a rolling wall of a rolling diaphragm increases in proportion to the length of the stroke of the piston body in case that the housing and the piston body define therebetween a toroidal space of progressively increasing inner or outer diameter.

The skirt 2a with its perforation 2b and the piston 4 are delay means tending to stabilize the operation of the pressure regulator, i.e. tending to establish equilibrium conditions following variations in fluid pressure.

The structure shown in FIG. 3 differs from that shown in FIG. 1 only inasmuch as the aforementioned delay and stabilization means have been dispensed with in the former. Therefore, and since like parts are designated by the same reference characters both in FIGS. 1 and 3, the latter is self-explanatory.

Referring now to the path of fluid flow indicated by the dash-and-dot lines A, it will be apparent from FIGS. 1 and 3 that piston body 2 is provided with passageway means 2c situated at one end surface thereof for the admission of fluid under pressure from passageway 1c and inlet area 1e into piston body 2. Piston body 2 is further provided with orifice means 2d at a lateral surface thereof for the admission of fluid under pressure from piston body 2 to outlet area 1f and outlet passageway 1d. The effective cross-sectional area of said orifice means 2d is under the control of rolling wall 8c of rolling diaphragm 8. As shown to the left of FIGS. 1 and 3 orifice 2d is entirely obstructed by rolling wall 8c and as shown to the right of FIGS. 1 and 3 orifice 2d is entirely cleared so that no limitation of fluid flow through it is effected by the action of rolling wall 8c.

FIGS. 1 and 3 show embodiments of the invention wherein the extent of the orifice means 2d is 360°. This does, however, not apply to the structure shown in FIG. 2.

In FIG. 2 the same reference characters with a prime added have been applied to designate like parts as in FIGS. 1 and 3. Hence FIG. 2 calls for a detailed description only to the extent that it differs from FIGS. 1 and 3.

As shown in FIG. 2, piston body 2' is provided with passageway means 2c' at the upper end surface thereof for the admission into it of fluid under pressure from inlet area 1e'l Piston body 2' is further provided with a plurality of discrete orifice means 2d' at the lateral surface thereof for the admission of fluid under pressure from the inside of piston body 2' to outlet area 1f. In FIG. 2 only one of said plurality of orifice means 2d' is shown. Orifice means 2d' are arranged in a circular pattern equidistantly spaced from each other around the lateral surface of piston body 2', and they have a width that varies in the direction of the longitudinal axis of piston body 2'. As shown in FIG. 2, orifice means 2d' is of substantially triangular shape. Its width is largest adjacent the upper end surface of piston body 2' and decreases progressively in downward direction. Such a geometry limits the rate of change of fluid flow through orifice means 2d' for a given increment of the stroke of piston body 2'. In the position of parts shown in FIG. 2 the rolling wall 8c' of rolling diaphragm 8 obstructs the upper wide portions of orifice means 2d', but allows an unimpeded flow of fluid through the lower portions of orifice means 2d' of relatively limited width. In other words, the position of parts shown in FIG. 2 corresponds to a position intermediate the limit positions shown in FIGS. 1 and 3.

The structure shown in FIGS. 1–3 have various applications. They are primarily differential pressure regulators used, e.g., to maintain a constant pressure at a given point of a gas distribution system. To this end inlet 1c is connected to a source of fluid under pressure, and outlet 1d is connected to a space of relatively lower pressure, e.g. to atmosphere. The structures of FIGS. 1–3 may further be used to maintain a predetermined vacuum in a vessel that is being evacuated by a vacuum pump, in which case passageway 1d is connected to the vessel that is being evacuated and passageway 1c is connected to atmosphere. The structures of FIGS. 1–3 are further applicable as blow-off valves or safety valves as will be explained below in more detail. In that instance the passageway 1c is connected to a vessel wherein pressure is to be maintained below a predetermined level, and passageway 1d is connnected to atmosphere.

Regarding the preferred nature of rolling diaphragms 8,8', reference may be had to my U.S. Pat. No 2,849,026; 8/26/58 for FLEXIBLE FLUID SEALING DIAPHRAGM and my U.S. Pat. No. 3,236,158; 2/22/66 for ROLLING DIAPHRAGMS, both disclosing rolling diaphragms particularly suitable for the purpose in hand.

In operation the tension of spring 11 is adjusted by regulating screw 12 until the desired pressure differential across the rolling diaphragm 8 is attained.

The force balance equation is Spring force = (inlet pressure — outlet pressure) X (effective area rolling wall of rolling diaphragm). Any change of the difference (inlet pressure — outlet pressure) results in an imbalance of the system. This, in turn, results in a change of flow conditions by the action of the rolling wall 8c of the rolling diaphragm 8. The change in flow conditions results in a new equilibrium or balance condition.

In order to compensate for the change of the force of spring 11 as piston body 2 changes its location in the process of opening and closing pressure control orifices 2d to maintain a constant pressure differential across diaphragm 8, the effective area of rolling wall 8c thereof is changed so that the increase or decrease in spring force for the new position is compensated by a corresponding increase or decrease of the effective area of the rolling wall 8c of diaphragm 8.

Referring now to FIG. 6, this figure shows a flow regulator or flow controller intended to maintain a constant difference in pressure between the areas $P_1$ and $P_2$. This means that the rate of flow across orifices o will be constant.

The structure of FIG. 6 has an inlet 1c" and an outlet 1d". Piston body 2" is suspended on spring 11" which, in turn, is affixed to regulating screw 12". The rolling diaphragm 8" comprises the three parts 8a", 8b" and 8c". Below piston body 2" a cup-shaped member 2a" is fixedly arranged which defines the passageway A".

The left side of FIG. 6 shows the valve in fully open position, i.e. fluid is free to flow from intake 1c", passageway or orifice o in piston body 2" and from there through passageway A" to fluid outlet 1d".

As shown to the right of FIG. 6 piston body 2" has been lowered to such an extent that it engages cup-shaped member 2a" and that the rolling wall 8b" of rolling diaphragm 8" completely obstructs the entrance of passageway A". In this position of piston body 2" no flow of fluid through orifice or orifices o can occur. A flow of fluid through o and A" will occur as long as $P_1 > P_2$ and $P_1-P_2$ will be held constant as long as the above flow occurs.

FIG. 7 refers to a safety relief or blow off valve. It will be apparent that valves according to this invention are capable of gradually modulating a flow of fluid. In the extreme case shown in FIG. 7 the valve is bistable, i.e. it has only two positions, i.e. it is either fully closed or fully opened. This is achieved by making the characteristic of FIG. 5 sufficiently steep.

The left of FIG. 7 shows the fluid intake 1c''', the fluid outlet 1d''', the piston body 2''', the rolling diaphragm 8''', spring 11''', and regulating screw 12'''. Piston body 2'''has an opening 2c''' in the end surface thereof. As shown to the left of FIG. 7 the rolling diaphragm 8'''completely obstructs passageway A''' leading to outlet 1d'''. The position of parts shown to the left of FIG. 7 obtains as long as the pressure in space 1e''' is less than a critical value. If that value is exceeded piston body 2''' moves suddenly from the position shown to the left of FIG. 7 to the position shown to the right of FIG. 7, thus fully opening passageway A'''.

It will be observed from FIG. 7 that the angles of the taper on the piston body 2''' and that on the lower cylinder body 1b''' are opposite. The former has been designated by the reference character $X_1$ and the latter by the reference character $X_2$. This causes a large increase of the diaphragm area as the piston body 2''' is moved against the bias of spring 11'''. To be more specific, as the result of the above geometry the "pressure gradient" of diaphragm 8 exceeds the gradient of spring 11''', thus rendering the valve of FIG. 7 bistable.

In FIG. 1 the rate of change of the rolling wall of diaphragm 8 is solely due to the slanting wall portion 1g inclined relative to the longitudinal axis of the housing. In FIG. 6 and particularly in FIG. 7 the wall portions $X_1, X_2$ slant in opposite direction, piston body wall portion $X_1$ converging in downward direction and cylinder body wall portion $X_2$ diverging in downward direction. This geometry causes a more rapid rate of change of the force acting on the effective area of rolling diaphragm 8 than the change of the opposite force of spring 11 when the piston body and the spring are displaced equal distances.

I claim as my invention:

1. An automatic pressure regulator including in combination
   (a) housing means defining an inlet passageway and an outlet passageway and an inlet area adjacent said inlet passageway and an outlet area adjacent said outlet passageway;
   (b) a piston body arranged and movable inside said housing means, said piston body defining an additional passageway through said piston body allowing the flow of fluid from said inlet area to said outlet area of said housing means;
   (c) a deep convolution rolling diaphragm having a radially outer portion affixed to said housing means, a radially inner portion affixed to said piston body and a rolling wall interposed between said housing means and said piston body, one side of said rolling wall being acted upon by the pressure prevailing in said inlet area and the other side of said rolling wall being acted upon by the pressure prevailing in said outlet area, and said rolling wall being arranged to control the effective cross-sectional area of said additional passageway so as to control the flow of fluid from said inlet area through said piston body to said outlet area;
   (d) spring means interposed between said housing means and said piston body biasing said piston body to move in a direction tending to cause said rolling wall of said rolling diaphragm to reduce said effective cross-sectional area of said additional passageway; and
   (e) means for increasing the effective area of said rolling wall of said rolling diaphragm as said piston body moves against the action of said spring means.

2. An automatic pressure regulator as specified in claim 1 wherein said spring means is a tension spring, and wherein said housing means and said piston body are shaped in such a way that the effective area of said rolling wall of said rolling diaphragm increases progressively as the stroke of said piston body against the bias of said tension spring increases progressively.

3. An automatic pressure regulator as specified in claim 1 wherein said piston body is provided with a passageway means at one end surface thereof for the admission of fluid under pressure from said inlet area into said piston body, wherein said piston body is further provided with orifice means at a lateral surface thereof for the admission of fluid under pressure from said piston body to said outlet area, and wherein the effective cross-sectional area of said orifice means is under the control of said rolling wall of said rolling diaphragm.

4. An automatic pressure regulator as specified in claim 3 wherein said orifice means has an extent of 360°.

5. An automatic pressure regulator as specified in claim 1 wherein said piston body is provided with passageway means at one end surface thereof for the admission of fluid under pressure from said inlet area into said piston body, wherein said piston body is further provided with a plurality of discrete orifice means at the lateral surface thereof for the admission of fluid under pressure from the inside of said piston body to said outlet area, wherein each of said plurality of orifice means has a width that varies in the direction of the longitudinal axis of said piston body, and wherein the effective cross-sectional area of said plurality of discrete orifice means is under the control of said rolling wall of said rolling diaphragm.

6. An automatic pressure regulator as specified in claim 1 wherein said piston body is provided with a cylindrical skirt forming a damping cylinder jointly movable with said piston body, and wherein said housing means support a fixed piston arranged inside said damping cylinder.

7. An automatic pressure regulator including
   (a) a housing defining an inlet passageway and an outlet passageway;
   (b) a piston body movably arranged inside said housing and having aperture means defining an additional passageway through said piston body from said inlet passageway to said outlet passageway;
   (c) a rolling diaphragm having a radially outer portion affixed to said housing, a radially inner portion affixed to said piston body and a rolling wall arranged inside a toroidal gap left between said housing and said piston body and controlling the effective cross-sectional area of said additional passageway;
   (d) a spring interposed between said housing and said piston body biasing said piston body to move in one direction against the pressure of fluid admitted to said inlet passageway upon said rolling wall of said rolling diaphragm; and
   (e) means biasing said piston body to move in opposite direction against the action of said spring, said means including said rolling wall of said rolling diaphragm and means causing the effective area of said rolling wall of said rolling diaphragm to increase as said piston body means against the bias of said spring.

8. An automatic pressure regulator as specified in claim 7 wherein said spring is a tension spring affixed at one of the ends thereof by means of a spring-tension-regulating screw to said housing and supporting said piston body on the other end thereof.

9. An automatic pressure regulator as specified in claim 7 wherein said means biasing said piston body to move against the action of said spring cause a higher rate of increase of force than the rate of increase of force of said spring acting in opposite direction so that said piston body is bistable having but two stable limit positions but no stable intermediate positions.

10. An automatic pressure regulator as specified in claim 9 wherein said bistable condition of said piston body is achieved by an inclination of the lateral walls of said piston body cooperating with said rolling wall of said rolling diaphragm and by an inclination of the lateral wall of said housing cooperating with said rolling wall of said rolling diaphragm in opposite directions.

11. An automatic pressure regulator as specified in claim 7 wherein the lateral wall of said piston body is inclined relative to the longitudinal axis of said piston body to increase the rate of change of the effective area of said rolling wall of said rolling diaphragm as said piston body changes positions relative to said housing.

12. An automatic pressure regulator as specified in claim 7 wherein the lateral wall of said housing is inclined relative to the longitudinal axis of said housing to increase the rate of change of the effective area of said rolling wall of said rolling diaphragm as said piston body changes positions relative to said housing.

13. An automatic pressure regulator as specified in claim 7 wherein the lateral wall of said piston body and the lateral wall of said housing are inclined in opposite directions relative to the joint longitudinal axis of said piston body and of said housing tending to maximize the rate of change of the effective area of said rolling wall of said rolling diaphragm as said piston body is moved relative to said housing.

14. A regulator as specified in claim 7 wherein two serial passageways are arranged between said inlet passageway and said outlet passageway, one of said passageways being of invariant effective cross-sectional area and connecting the space above and the space below the end surface of said piston body and the other of said passageways connecting the space below said end surface of said piston body and said outlet passageway and having an effective cross-sectional area which is controlled by said rolling wall of said rolling diaphragm.

* * * * *